(12) United States Patent
Kim et al.

(10) Patent No.: US 10,129,895 B2
(45) Date of Patent: Nov. 13, 2018

(54) METHOD AND APPARATUS FOR WIRELESS RESOURCE SCHEDULING WITH GUARANTEED QOS IN MOBILE COMMUNICATION SYSTEM

(71) Applicants: Electronics and Telecommunications Research Institute, Daejeon (KR); University-Industry Cooperation Group of Kyung Hee University, Yongin-si, Gyeonggi-do (KR)

(72) Inventors: Kyung Sook Kim, Daejeon (KR); Een Kee Hong, Seongnam-si (KR); Dong Seung Kwon, Daejeon (KR); Dae Ik Kim, Daejeon (KR); Sung Kyung Kim, Daejeon (KR); Jee Hyeon Na, Daejeon (KR); Ye Ok Jang, Yongin-si (KR); Eun Hyung Cho, Yongin-si (KR); Hyun Jin Kim, Yongin-si (KR)

(73) Assignees: Electronics and Telecommunications Research Institute, Daejeon (KR); University-Industry Cooperation Group of Kyung Hee University, Yongin-si (KR)

(*) Notice: Subject to any disclaimer, the term of this patent is extended or adjusted under 35 U.S.C. 154(b) by 32 days.

(21) Appl. No.: 15/183,426

(22) Filed: Jun. 15, 2016

(65) Prior Publication Data
US 2017/0006624 A1 Jan. 5, 2017

(30) Foreign Application Priority Data

Jul. 2, 2015 (KR) .................. 10-2015-0094712

(51) Int. Cl.
*H04W 72/12* (2009.01)
*H04W 72/04* (2009.01)
(Continued)

(52) U.S. Cl.
CPC ....... *H04W 72/0486* (2013.01); *H04W 24/08* (2013.01); *H04W 28/0268* (2013.01); *H04W 72/1252* (2013.01)

(58) Field of Classification Search
CPC ......... H04W 72/0486; H04W 72/1252; H04W 28/0268; H04W 24/08
See application file for complete search history.

(56) References Cited

U.S. PATENT DOCUMENTS

2009/0088080 A1* 4/2009 Zhang ............... H04W 72/0486
455/63.1
2012/0300635 A1* 11/2012 Jersenius .............. H04L 1/1887
370/235

(Continued)

FOREIGN PATENT DOCUMENTS

KR 10-2014-0144125 A 12/2014

*Primary Examiner* — Anh Vu H Ly
*Assistant Examiner* — Hector Reyes
(74) *Attorney, Agent, or Firm* — William Park & Associates Ltd.

(57) ABSTRACT

Disclosed are a method and an apparatus that reflect the quantity of wireless resources allocatable to a user terminal in a scheduling target cell to calculate the quantity of available wireless resources for quality of service (QoS) requirements for each kind of varied traffic of user terminals and a metric having a flexible weight for the QoS requirements and support efficient wireless resource scheduling among the user terminals.

16 Claims, 4 Drawing Sheets

(51) Int. Cl.
*H04W 28/02* (2009.01)
*H04W 24/08* (2009.01)

(56) References Cited

U.S. PATENT DOCUMENTS

2014/0016574 A1    1/2014  Seo et al.
2014/0254517 A1    9/2014  Nam et al.
2015/0282140 A1*  10/2015  Ezaki .................... H04W 24/08
                                                        370/330

* cited by examiner

METHOD AND APPARATUS FOR WIRELESS RESOURCE SCHEDULING WITH GUARANTEED QOS IN MOBILE COMMUNICATION SYSTEM

CROSS-REFERENCE TO RELATED APPLICATIONS

This application claims priority to and the benefit of Korean Patent Application No. 10-2015-0094712 filed in the Korean Intellectual Property Office on Jul. 2, 2015, the entire contents of which are incorporated herein by reference.

TECHNICAL FIELD

The present invention relates to a method and an apparatus for wireless resource scheduling in a mobile communication system, and particularly, to a method and an apparatus for supporting efficient wireless resource scheduling among user terminals having quality of service (QoS) requirements for each type of varied traffic.

BACKGROUND ART

Various QoS scheduling techniques have been researched, which give a weight to a scheduling metric according to a priority, a delay, and the like that are QoS requirements for efficient resource distribution considering a QoS. Representative techniques include, for example, maximum-largest weighted delay first (M-LWDF), exponential-proportional fairness (EXP-PF), and the like.

Meanwhile, when a macro cell and a small cell use different wireless resources by an orthogonal deployment (OD) scheme in heterogeneous networks, the scheduling technique considering the QoS needs to vary depending on the quantity of wireless resources which may be allocated to a user terminal in each cell. Further, like a carrier aggregation technology or a licensed assisted access (LAA) technology, when multiple cells are operated on a network for mobile communication, the scheduling technique considering the QoS needs to vary depending on the quantity of wireless resources which may be allocated to the user terminal in each cell. For example, when the quantity of the wireless resources which may be allocated to the user terminal in the cell is small, the QoS for user traffic having a high priority like VoIP needs to be more certainly guaranteed. In the related art, there is a problem in that the quantity of wireless resources which a base station can allocate to the user terminal is not considered.

SUMMARY OF THE INVENTION

The present invention has been made in an effort to provide a method and an apparatus that reflect the quantity of wireless resources allocatable to a user terminal in a scheduling target cell to calculate the quantity of available wireless resources for quality of service (QoS) requirements for each type of varied traffic of user terminals and a metric having a flexible weight for the QoS requirements and support efficient wireless resource scheduling among the user terminals.

The technical objects of the present invention are not limited to the aforementioned technical objects, and other technical objects, which are not mentioned above, will be apparently appreciated to a person having ordinary skill in the art from the following description.

An exemplary embodiment of the preset invention provides a method for wireless resource scheduling in a mobile communication system, including: checking a traffic load amount of target traffic to schedule; determining whether the traffic load amount is larger than a predetermined rate A of a channel resource capacity of a scheduling target cell; and allocating a resource according to a metric for transmitting/receiving the data traffic by calculating the metric for the resource allocation according to a result of the determination.

In the allocating, when the traffic load amount is equal to or smaller than A according to the result of the determination, the resource is allocated to user terminals by calculating the metric by a proportional fairness scheme.

In the allocating, when the traffic load amount is larger than A according to the result of the determination, the resource allocating unit may calculate the metric by reflecting the quantity of wireless resources allocatable to the user terminal in the scheduling target cell to allocate the resource to the user terminals.

As the quantity of wireless resources allocatable to the user terminal in the scheduling target cell is small, the metric may be calculated to reflect a higher priority of traffic of each user terminal.

In the allocating, a metric $m_{i,j}$ may be calculated by using an equation given below, $$m_{i,j} = \frac{R_i(t)}{\overline{R}_i(t-1)} \cdot \left(\frac{M}{K}\right)^S$$

$$S = \delta * (9 - priority_{i,j}) / \alpha$$

where $/R_i$ represents an average transmission amount transmitted to each user terminal i up to the previous scheduling time t-1, $R_i$ represents a maximum transmission amount transmittable to each user terminal i at a current scheduling time t, M represents the number of all network resource block groups (RBGs), K represents the number of RBGs allocatable to the user terminal in the scheduling target cell, $priority_{i,j}$ represents the priority of the traffic of each user terminal i with respect to each logic channel j, and a represents a scale factor. α may be determined by the traffic load amount and K.

Where M may represent the number of all corresponding network RBGs including a macro cell and one or more small cells according to an orthogonal deployment (OD) scheme, M may represent the number of all corresponding network RBGs including multiple corresponding cells according to a carrier aggregation scheme or a licensed assisted access (LAA) scheme, and M may represent a constant value which is larger than the number of RBGs determined by a bandwidth of the corresponding base station system in a base station operating a single cell.

Another exemplary embodiment of the present invention provides an apparatus for wireless resource scheduling on a network for mobile communication, including: a load checking unit checking a traffic load amount of target traffic to schedule; a comparison unit determining whether the traffic load amount is larger than a predetermined rate A of a channel resource capacity of a scheduling target cell; and a resource allocating unit allocating a resource according to a metric for transmitting/receiving the data traffic by calculating the metric for the resource allocation according to a result of the determination. When the traffic load amount is equal to or smaller than A according to the result of the determination, the resource allocating unit may allocate the resource to user terminals by calculating the metric by a proportional fairness scheme.

When the traffic load amount is larger than A according to the result of the determination, the resource allocating unit may calculate the metric by reflecting the quantity of wireless resources allocatable to the user terminal in the scheduling target cell to allocate the resource to the user terminals.

As the quantity of wireless resources allocatable to the user terminal in the scheduling target cell is small, the resource allocating unit may calculate the metric to reflect a higher priority of traffic of each user terminal.

The resource allocating unit may calculate a metric $m_{i,j}$ by using an equation given below, $$m_{i,j} = \frac{R_i(t)}{\overline{R_i}(t-1)} \cdot \left(\frac{M}{K}\right)^S$$

$$S = \delta * (9 - priority_{i,j}) / \alpha$$

Where $/R_i$ represents an average transmission amount transmitted to each user terminal i up to the previous scheduling time t-1, $R_i$ represents a maximum transmission amount transmittable to each user terminal i at a current scheduling time t, M represents the number of all network resource block groups (RBGs), K represents the number of RBGs allocatable to the user terminal in the scheduling target cell, $priority_{i,j}$ represents the priority of the traffic of each user terminal i with respect to each logic channel j, and α represents a scale factor. α may be determined by the traffic load amount and K. Where M may represent the number of all corresponding network RBGs including a macro cell and one or more small cells according to an orthogonal deployment (OD) scheme, M may represent the number of all corresponding network RBGs including multiple corresponding cells according to a carrier aggregation scheme or a licensed assisted access (LAA) scheme, and M may represent a constant value which is larger than the number of RBGs determined by a bandwidth of the corresponding base station system in a base station operating a single cell.

According to exemplary embodiments of the present invention, the wireless resource scheduling apparatus allocates and distributes the resources by calculating the metric by reflecting the quantity of wireless resources allocatable to the user terminal in the scheduling target cell to support the efficient wireless resource scheduling among the user terminals and particularly, further increases the priority of the GBR traffic (e.g., VoIP, video, game, and the like) as the quantity of wireless resources allocatable to the user terminal in the scheduling target cell is small to guarantee the QoS.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

Figure 1:
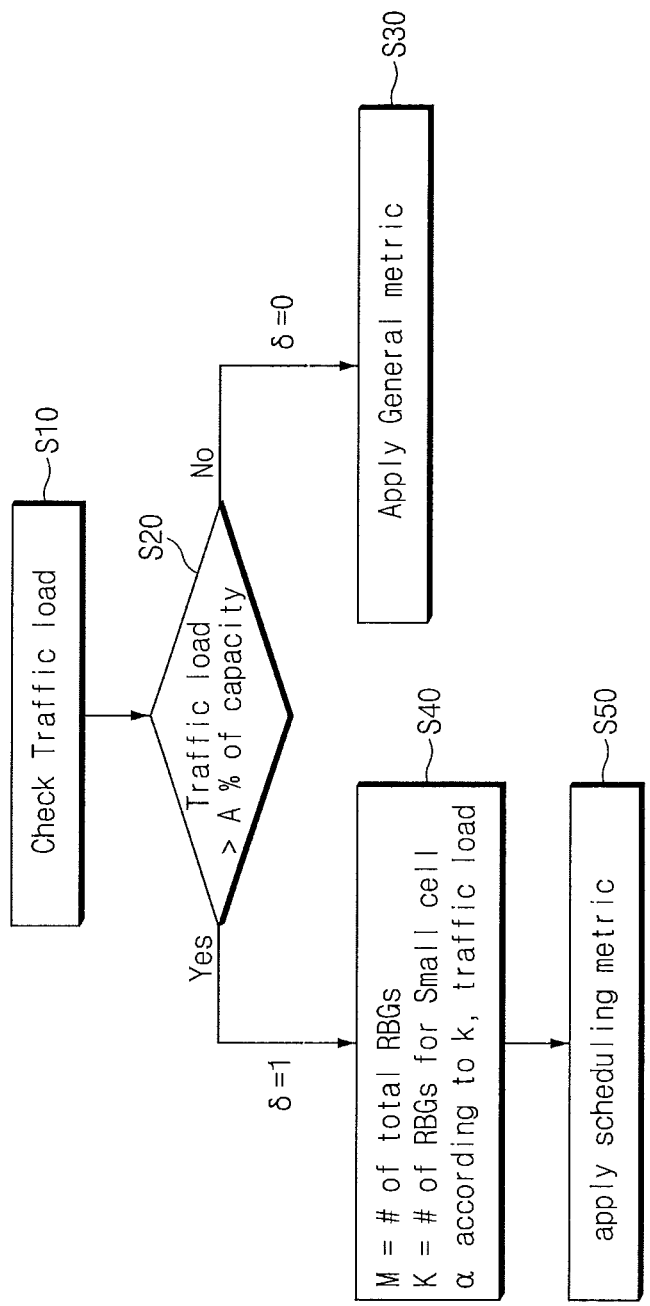
FIG. 1 is a diagram for describing a scheduling apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some exemplary embodiments of the present invention will be described in detail with reference to the exemplary drawings. When reference numerals refer to components of each drawing, it is noted that although the same components are illustrated in different drawings, the same components are designated by the same reference numerals as much as possible. In describing the exemplary embodiments of the present invention, when it is determined that the detailed description of the known components and functions related to the present invention may obscure understanding of the exemplary embodiments of the present invention, the detailed description thereof will be omitted.

Terms such as first, second, A, B, (a), (b), and the like may be used in describing the components of the exemplary embodiments of the present invention. The terms are only used to distinguish a component from another component, but nature or an order of the component is not limited by the terms. Further, if it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as ideal meaning or excessively formal meanings unless clearly defined in the present application.

FIG. 1 is a diagram for describing a scheduling apparatus 100 according to an exemplary embodiment of the present invention. The scheduling apparatus 100 according to the exemplary embodiment of the present invention may be provided in a base station (macro base station/small cell base station) on heterogeneous networks covering the macro cell and small cell(s) for a mobile communication system or a predetermined control station connected to the base station or a base station (macro base station/small cell base station) operating multiple cells like a carrier aggregation technology or a licensed assisted access (LAA) technology or a predetermined control station connected to the base station and reflects the quantity of wireless resources which may be allocated to a user terminal in resource allocation and distribution processing in a scheduling target cell of a corresponding network to support efficient wireless resource scheduling among user terminals accessing the base station. Referring to FIG. 1, the scheduling apparatus 100 according to the exemplary embodiment of the present invention may include a load checking unit 110, a comparison unit 120, and a resource allocating unit 130. Respective components of the scheduling apparatus 100 may be implemented by hardware, software, or a combination thereof and in some cases, a function of any one unit may be implemented to be performed in another unit.

Herein, functions of the respective components of the scheduling apparatus 100 will be simply described.

The load checking unit 110 checks a traffic load amount for scheduling target data traffic received from the user terminals, and the like.

The comparison unit 120 determines whether the traffic load amount is larger than a predetermined rate (e.g., A=80%) of a channel resource capacity of a scheduling target cell.

The resource allocating unit 130 calculates a metric as shown in [Equation 1] given below for the resource allocation according to a result of the determination to allocate the wireless resource for transmitting/receiving a plurality of logic channel data to each user terminal according to the metric for transmitting/receiving the data traffic.

Figure 2:
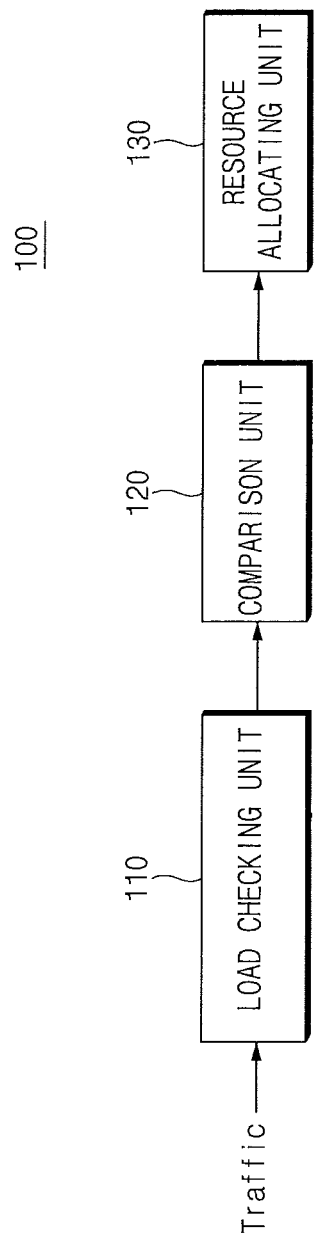
FIG. 2 is a flowchart for describing an operation of a scheduling apparatus according to an exemplary embodiment of the present invention.

FIG. 2 is a flowchart for describing an operation of a scheduling apparatus 100 according to an exemplary embodiment of the present invention.

For resource allocation and distribution for the scheduling target data traffic received from the user terminals, and the like, first, the load checking unit 110 checks the traffic load amount of target traffic to schedule (S10).

Next, the comparison unit 120 compares the predetermined rate (e.g., A=80%) of the channel resource capacity of the scheduling target cell and the traffic load amount to determine whether the traffic load amount is larger than A (S20). When the traffic load amount is larger than A, a parameter δ is 1 and when the traffic load amount is equal to or smaller than A, the parameter δ is 0, and as a result, the parameter δ is applied to [Equation 1] given below. Herein, A which is the rate of the channel resource capacity compared with the traffic load amount is 80% as an example, but is not limited thereto and may be variously modified and used according to the system application.

As a result of the comparison in the comparison unit 120, when the traffic load amount is equal to or smaller than A (δ=0), the resource allocating unit 130 may control data to be transmitted/received by allocating the resource to the user terminals by a general metric calculating scheme including a proportional fairness (PF) scheme which is the conventional scheduling scheme, and the like (S30). For example, the resource allocating unit 130 calculate, as shown in [Equation 1], a metric $m_{i,j}$ when δ=0, that is, a metric $m_{i,j}$ representing a ratio of a maximum transmission amount $R_i$, transmittable to each user terminal i at a current scheduling time t to an average transmission amount $/R_i$ transmitted to each user terminal i up to the previous scheduling time t-1 for each logic channel j to allocate the resource to each user terminal i through each logic channel j according to the size of the metric $m_{i,j}$, thereby allocating more resources to a user terminal having an excellent wireless channel state.

$$m_{i,j} = \frac{R_i(t)}{\overline{R_i}(t-1)} \cdot \left(\frac{M}{K}\right)^S \quad \text{[Equation 1]}$$

-continued
$$S = \delta * (9 - priority_{i,j}) / \alpha$$

As the result of the comparison in the comparison unit 120, when the traffic load amount is larger than A (δ=1), the resource allocating unit 130 decides the number M of resource block groups (RBGs) of all networks, the number K of RBGs allocatable to the user terminal in the scheduling target cell, and a scale factor value a decided by the traffic load amount and K (S40) and calculates the metric $m_{i,j}$ according to $priority_{i,j}$ of the traffic of each user terminal, for each logic channel j when δ=1 as shown in [Equation 1] to control data to be transmitted/received by allocating the resource to each user terminal i through each logic channel j according to the size thereof (S50). The $priority_{i,j}$ may be predetermined to be a predetermined value (e.g., a value of 1 to 9) in an upper layer with respect to guaranteed bit rate (GBR) traffic and non GBR (NGBR) traffic.

Herein, M which is the number of all network RBGs may be the number of all corresponding network RBGs including the macro cell and one or more small cells when the macro cell and the small cell(s) use different wireless resources by an orthogonal deployment (OD) scheme in the heterogeneous networks. Alternatively, M which is the number of all network RBGs may be, when multiple cells are operated on the network for the mobile communication like the carrier aggregation technology or the licensed assisted access (LAA) technology, the number of RBGs of all corresponding networks including the corresponding multiple cells. Further, in the case of a base station operating a single cell, M which is the number of all network RBGs may be determined as a larger constant than the number of RBGs determined by a bandwidth of the corresponding base station system. In the present invention, as shown in [Equation 1], as the of wireless resources allocatable to the user terminal in the scheduling target cell by K decreases, an influence of the priority $priority_{i,j}$ is increases, and as a result, traffic having the higher $priority_{i,j}$ is further guaranteed. Further, when a traffic amount to which the resource needs to be allocated is smaller than a predetermined criterion in the scheduling target cell, it may be regarded that a high quality of service may be provided without a separate guarantee. Therefore, a QoS scheduling algorithm having higher complexity than the conventional PF scheduling scheme is not required and an application scheduling algorithm is selectively applied according to the traffic load amount with the parameter δ by considering problems including the complexity, and the like to simply and effectively implement a scheduler.

Figure 3:
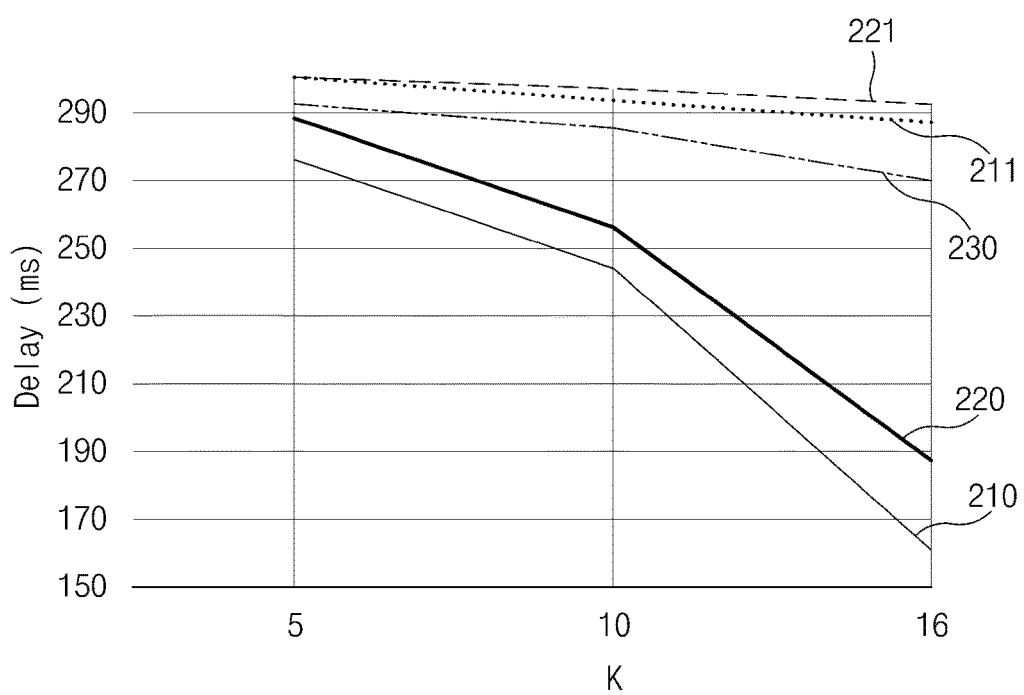
FIG. 3 is a graph for a traffic delay time for comparing and describing a scheduling capability of the scheduling apparatus according to the exemplary embodiment of the present invention and a scheduling capability in the conventional scheme.

FIG. 3 is a graph for a traffic delay time for comparing and describing a scheduling capability of the scheduling apparatus 100 according to the exemplary embodiment of the present invention and a scheduling capability in the conventional scheme.

When the quantity of wireless resources allocatable to the user terminal in the scheduling target cell is small, it is impossible to sufficiently protect guaranteed bit rate (GBR) traffic by the conventional scheduling scheme such as PF or EXP-PF. In the present invention, as the quantity of wireless resources allocatable to the user terminal in the scheduling target cell is small, the priority of the GBR traffic (e.g., VoIP, video, game, or the like) further increases to guarantee the QoS. As illustrated in FIG. 3, as the wireless resources (the number of RBGs, K) allocatable to the user terminal in the scheduling target cell decrease, a service quality for the user terminal is degraded, and as a result, a capability deteriorates. When K increases, available resources are increased, and as a result, an overall delay time decreases.

As compared with a delay time 230 of the conventional PF as the most representative scheduling technique, it can be seen that a delay time 211 of the non GBR (NGBR) in the technique of the present invention increases, but a delay time 210 of the GBR in the technique of the present invention significantly decreases.

In particular, as compared with a delay time (reference numeral 220 in the case of the GBR and reference numeral 221 in the case of the NGBR) of maximum-largest weighted delay first (M-LWDF) as the conventional QoS scheduling technique, it can be seen that the delay time 210 in the GBR according to the technique of the present invention is shorter than the delay time 220 of the M-LWDF and moreover, it can be seen that the delay time 211 of the NGBR is also shorter than the delay time 221 of the M-LWDF by a small degree.

Figure 4:
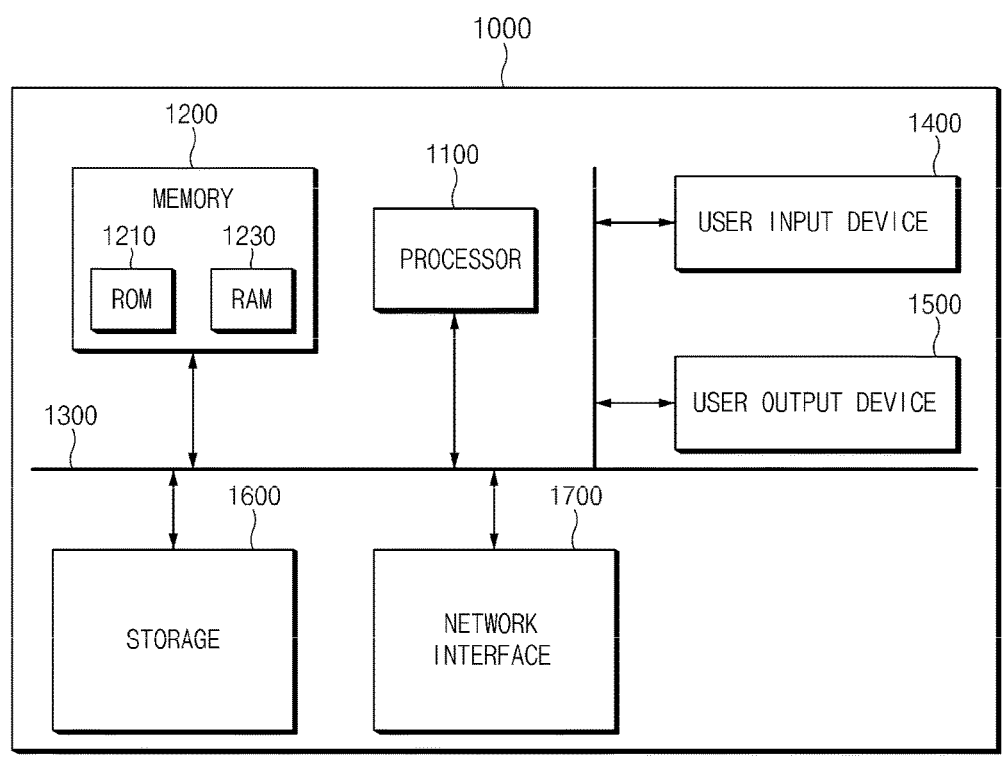
FIG. 4 is a diagram for describing an example of a method for implementing a scheduling apparatus according to an exemplary embodiment of the present invention.

FIG. 4 is a diagram for describing an example of a method for implementing a scheduling apparatus 100 according to an exemplary embodiment of the present invention. The scheduling apparatus 100 according to the exemplary embodiment of the present invention may be constituted by hardware, software, or combinations thereof. For example, the scheduling apparatus 100 may be implemented as a computing system 1000 illustrated in FIG. 4.

The computing system 1000 may include at least one processor 1100, a memory 1300, a user interface input device 1400, a user interface output device 1500, a storage 1600, and a network interface 1700 connected through a bus 1200. The processor 1100 may be a semiconductor device that executes processing of commands stored in a central processing unit (CPU) or the memory 1300 and/or the storage 1600. The memory 1300 and the storage 1600 may include various types of volatile or non-volatile storage media. For example, the memory 1300 may include a read only memory (ROM) and a random access memory (RAM).

Therefore, steps of a method or an algorithm described in association with the embodiments disclosed in the specification may be directly implemented by hardware and software modules executed by the processor 1100, or a combination thereof. The software module may reside in storage media (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100 and the processor 1100 may read information from the storage medium and write the information in the storage medium. As another method, the storage medium may be integrated with the processor 1100. The processor and the storage medium may reside in an application specific integrated circuit (ASIC). The ASIC may reside in the user terminal. As yet another method, the processor and the storage medium may reside in the user terminal as individual components.

As described above, the wireless resource scheduling apparatus 100 according to the present invention allocates and distributes the resources by calculating the metric by reflecting the quantity of wireless resources allocatable to the user terminal in the scheduling target cell to support the efficient wireless resource scheduling among the user terminals and particularly, further increases the priority of the GBR traffic (e.g., VoIP, video, game, and the like) as the quantity of wireless resources allocatable to the user terminal in the scheduling target cell is small to guarantee the QoS.

The above description just illustrates the technical spirit of the present invention and various modifications and transformations can be made by those skilled in the art without departing from an essential characteristic of the present invention. For example, the user equipment mentioned in the present invention may be a mobile terminal such as a smart phone, a notebook PC, a tablet PC, or the like and in some cases, the user equipment 101 may be a personal digital assistant (PDA), a portable multimedia player (PMP), or the like and in addition, may include all electronic devices in which mobile communications (e.g., CDMA, WCDMA, LTE, and the like) or Internet communications (e.g., WiBro, WiFi, and the like) may be supported.

Therefore, the exemplary embodiments disclosed in the present invention are used to not limit but describe the technical spirit of the present invention and the scope of the technical spirit of the present invention is not limited by the exemplary embodiments. The scope of the present invention should be interpreted by the appended claims and it should be analyzed that all technical spirit in the equivalent range are intended to be embraced by the present invention.

What is claimed is:

1. A method for wireless resource scheduling in a mobile communication system, the method comprising:
   checking a traffic load amount of target data traffic to schedule;
   when the traffic load amount is larger than a predetermined rate of a channel resource capacity of a scheduling target cell, obtaining a number of all network resource block groups (RBGs);
   obtaining a number of RBGs allocatable to a user terminal in the scheduling target cell;
   obtaining predetermined priority of traffic of the user terminal;
   determining a scale factor based on the traffic load amount and the number of RBGs allocatable;
   calculating an exponential term including a base including a first rate between the number of all network resource block groups and the number of RBGs allocatable and a exponent including a second rate between the predetermined priority and the scale factor;
   calculating a metric for allocating resource to the user terminal using the exponential term;
   allocating a resource to the user terminal according to the metric; and
   transceiving the target data traffic based on the resource allocated to the user terminal.

2. The method of claim 1, wherein in the allocating, when the traffic load amount is equal to or smaller than the predetermined rate of a channel resource capacity of a scheduling target cell according to the result of the determination, the resource is allocated to the user terminal by calculating the metric by a proportional fairness scheme.

3. The method of claim 1, wherein in the allocating, when the traffic load amount is larger than the predetermined rate of a channel resource capacity of a scheduling target cell according to the result of the determination, the metric is calculated by reflecting the quantity of wireless resources allocatable to the user terminal in the scheduling target cell to allocate the resource to the user terminals.

4. The method of claim 3, wherein as the quantity of wireless resources allocatable to the user terminal in the scheduling target cell is small, the metric is calculated to reflect a higher priority of traffic of each user terminal.

5. The method of claim 1, wherein in the allocating, a metric $m_{i,j}$ is calculated by using an equation given below, $$m_{i,j} = \frac{R_i(t)}{\overline{R_i}(t-1)} \cdot \left(\frac{M}{K}\right)^S$$

$$S = \delta * (9 - priority_{i,j})/\alpha$$

where $R_i$ represents an average transmission amount transmitted to each user terminal i up to the previous scheduling time t-1, Ri represents a maximum transmission amount transmittable to each user terminal i at a current scheduling time t, M represents the number of all RBGs, K represents the number of RBGs allocatable to the user terminal in the scheduling target cell, $priority_{i,j}$ represents the priority of the traffic of each user terminal i with respect to each logic channel j, and α represents a scale factor.

6. The method of claim 5, wherein M represents the number of all corresponding network RBGs including a macro cell and one or more small cells according to an orthogonal deployment (OD) scheme.

7. The method of claim 5, wherein M represents the number of all corresponding network RBGs including multiple corresponding cells according to a carrier aggregation scheme or a licensed assisted access (LAA) scheme.

8. The method of claim 5, wherein M represents a constant value which is larger than the number of RBGs determined by a bandwidth of the corresponding base station system in a base station operating a single cell.

9. An apparatus for wireless resource scheduling on a network for mobile communication, the apparatus comprising:
a load checking unit checking a traffic load amount of target data traffic to schedule; a comparison unit configured for:
obtaining a number of all network resource block groups (RBGs) when the traffic load amount is larger than a predetermined rate of a channel resource capacity of a scheduling target cell;
obtaining a number of RBGs allocatable to a user terminal in the scheduling target cell;
obtaining predetermined priority of traffic of the user terminal;
determining a scale factor based on the traffic load amount and the number of RBGs allocatable;
calculating an exponential term including a base including a first rate between the number of all network resource block groups and the number of RBGs allocatable and a exponent including a second rate between the predetermined priority and the scale factor;
calculating a metric for allocating resource to the user terminal using the exponential term;
a resource allocating unit allocating a resource to the user terminal according to the metric, and transceiving the target data traffic based on the resource allocated to the user terminal.

10. The apparatus of claim 9, wherein when the traffic load amount is equal to or smaller than the predetermined rate of a channel resource capacity of a scheduling target cell according to the result of the determination, the resource allocating unit allocates the resource to the user terminal by calculating the metric by a proportional fairness scheme.

11. The apparatus of claim 9, wherein when the traffic load amount is larger than the predetermined rate of a channel resource capacity of a scheduling target cell according to the result of the determination, the resource allocating unit calculates the metric by reflecting the quantity of wireless resources allocatable to the user terminal in the scheduling target cell to allocate the resource to the user terminals.

12. The apparatus of claim 11, wherein as the quantity of wireless resources allocatable to the user terminal in the scheduling target cell is small, the resource allocating unit calculates the metric to reflect a higher priority of traffic of each user terminal.

13. The apparatus of claim 9, wherein the resource allocating unit calculates a metric $m_{i,j}$ by using an equation given below, $$m_{i,j} = \frac{R_i(t)}{\overline{R_i}(t-1)} \cdot \left(\frac{M}{K}\right)^S$$

$$S = \delta * (9 - priority_{i,j})/\alpha$$

where $R_i$ represents an average transmission amount transmitted to each user terminal i up to the previous scheduling time t-1, Ri represents a maximum transmission amount transmittable to each user terminal i at a current scheduling time t, M represents the number of all RBGs, K represents the number of RBGs allocatable to the user terminal in the scheduling target cell, $priority_{i,j}$ represents the priority of the traffic of each user terminal i with respect to each logic channel j, and α represents a scale factor.

14. The apparatus of claim 13, wherein M represents the number of all corresponding network RBGs including a macro cell and one or more small cells according to an orthogonal deployment (OD) scheme.

15. The apparatus of claim 13, wherein M represents the number of all corresponding network RBGs including multiple corresponding cells according to a carrier aggregation scheme or a licensed assisted access (LAA) scheme.

16. The apparatus of claim 13, wherein M represents a constant value which is larger than the number of RBGs determined by a bandwidth of the corresponding base station system in a base station operating a single cell.

* * * * *